Patented Sept. 4, 1928.

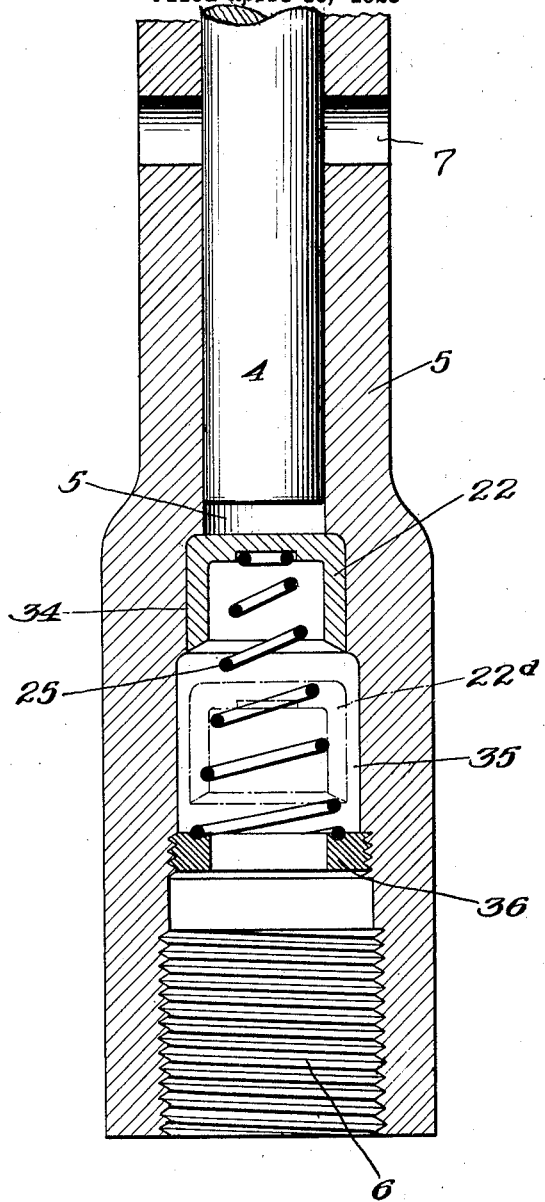

1,682,932

UNITED STATES PATENT OFFICE.

EMILE PIQUEREZ, OF PARIS, FRANCE, ASSIGNOR TO THE BASSICK MANUFACTURING COMPANY, OF CHICAGO, ILLINOIS, A CORPORATION OF DELAWARE.

DOUBLE-ACTION LUBRICANT COMPRESSOR.

Application filed April 15, 1925, Serial No. 23,352, and in France July 26, 1924.

My invention relates to dispensing material such as lubricant for machine elements under such pressures as are necessary to force the material into the place to be lubricated.

Among the primary objects of the invention may be included the automatic reduction of the pressure in the conduit distributing the lubricant, to permit easy disconnection of the conduit and eliminate loss of lubricant when disconnecting.

According to the invention, the discharge valve of the compression cylinder is permitted to operate as an auxiliary piston, which normally keeps the end of the cylinder closed under the tension of a spring, and under discharge pressure slides into a larger chamber to permit the passage of lubricant. When the auxiliary piston returns or comes back to its closed position under the action of the suction produced by the return stroke of the compressor piston it sucks out again a portion of the lubricant in the distributing conduit and its terminal connection, whereby the internal pressure is materially cut down.

The drawing is a central longitudinal section of one embodiment of the apparatus according to the invention.

As shown in the drawing, the compression cylinder 5 in which the piston 4 moves is continued by a chamber 34 of greater diameter, followed by another chamber 35 of still greater diameter, at the remote end of which the discharge passage 6 begins. The compression cylinder 5 may be filled in any suitable way, as by withdrawing the piston 4 past an inlet port 7 submerged in lubricant. When this occurs, the suction in the cylinder 5 will draw in lubricant.

The auxiliary piston 22 is positioned in the chamber 34 and forms the discharge valve, being normally pressed against the shoulder at the upper end of the chamber 34, the spring 25 bearing on a ring 36.

The length of the chamber 35 is such that when the auxiliary piston occupies the dotted line position 22ª under the action of discharge pressure, the lubricant can pass freely from the compression cylinder 5 to the discharge passage.

It will be noted that when the discharge pressure ceases the auxiliary piston will tend to reenter the chamber 34 under the action of the spring 25. If the compression piston 4 is also drawn upward the sucking action will assist in raising the piston 22, which will return to the full line position, in which position it closes the bottom of the cylnder 5. During the upward movement the auxiliary piston 22 will take from the lubricant below it, and in the chamber 35, the passage 6, and the distributing conduit connected thereto, so that the pressure will be considerably reduced in the conduit and its connection, which can thus be easily separated from the fitting to which it was coupled.

It will be obvious that the shape of the auxiliary piston in the embodiment disclosed, has only been shown for purposes of illustration, and that it can be changed in any suitable way without going outside the scope of the invention. The same is true of chamber 35, which, for instance, might be replaced by a series of passages or grooves in the wall of the body.

I claim:

1. A lubricant check valve comprising a tubular housing having a first portion of minimum diameter through which lubricant may enter, a second portion forming a cylindrical valve seat, a third portion, a fourth threaded portion, a fifth smooth portion, and a sixth threaded terminal portion, each portion being of larger diameter than the preceding portion, a ring threaded into the fourth portion, a valve member axially movable in the second and third portions, and a compression spring acting between ring and valve, said third portion being longer than the valve to leave clearance for flow around both ends of the same simultaneously.

2. A lubricant compressor comprising a cylinder having an outlet, a plunger in said cylinder, a discharge conduit communicating with said outlet and adapted to be coupled to a part to be lubricated, and a check valve between said cylinder and said conduit and having a cylindrical seat and a plane seat perpendicular to the axis of the cylinder, said valve preventing return flow of lubricant from said conduit by engagement with one seat and having continued movement in contact with said seat before engaging the other seat, said movement relieving the pressure of lubricant in said conduit.

3. A lubricant compressor comprising a barrel, a plunger in said barrel, a discharge conduit for said barrel adapted to be coupled to a part to be lubricated, and a check valve at one end of said barrel and having two seats, said valve preventing return flow of lubricant from said conduit to said barrel by engagement with one seat and having continued movement in contact with said seat before engaging the other seat, said movement increasing the capacity of said conduit and relieving the pressure therein.

4. A lubricant compressor comprising a barrel, a plunger in said barrel, a discharge conduit for said barrel adapted to be attached to a part to be lubricated, and means for controlling communication between said barrel and said conduit and serving to relieve the pressure on the lubricant in said conduit, said means comprising a check valve having a cylindrical seat and a plane seat, said valve closing return flow by engagement with one seat before engaging the other seat.

5. A lubricant compressor comprising a barrel, a plunger in said barrel, a discharge conduit for said barrel adapted to be coupled to a part to be lubricated, a movable valve controlling communication between said barrel and said conduit, a cylindrical seat for said valve, and means for moving said valve axially of said seat to simultaneously increase the capacity of said conduit and force lubricant into said barrel.

In witness whereof, I hereunto subscribe my name, this 23d day of March, 1925.

EMILE PIQUEREZ.